United States Patent Office 3,580,816
Patented May 25, 1971

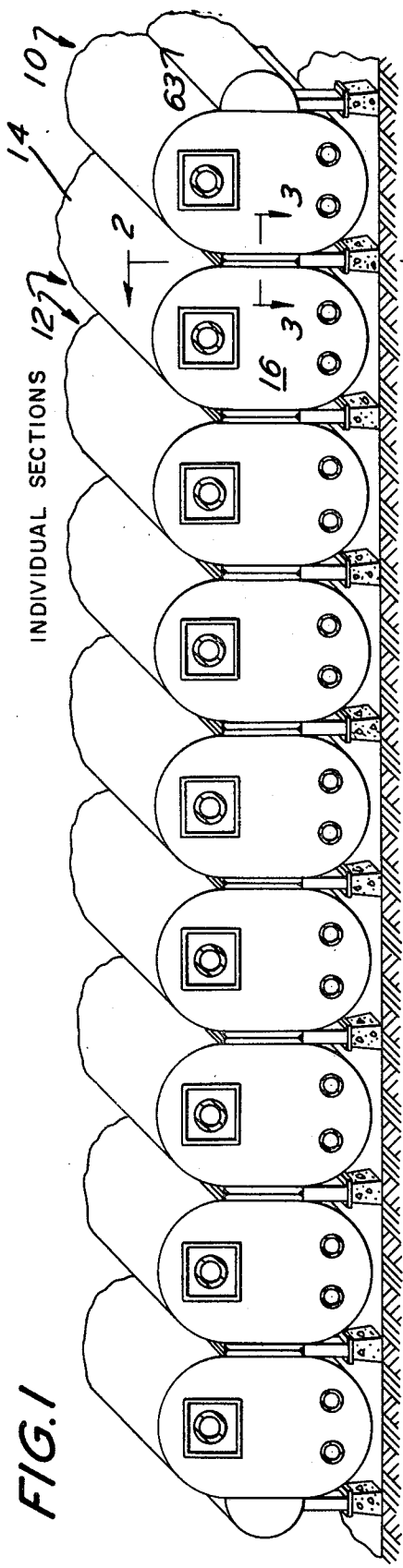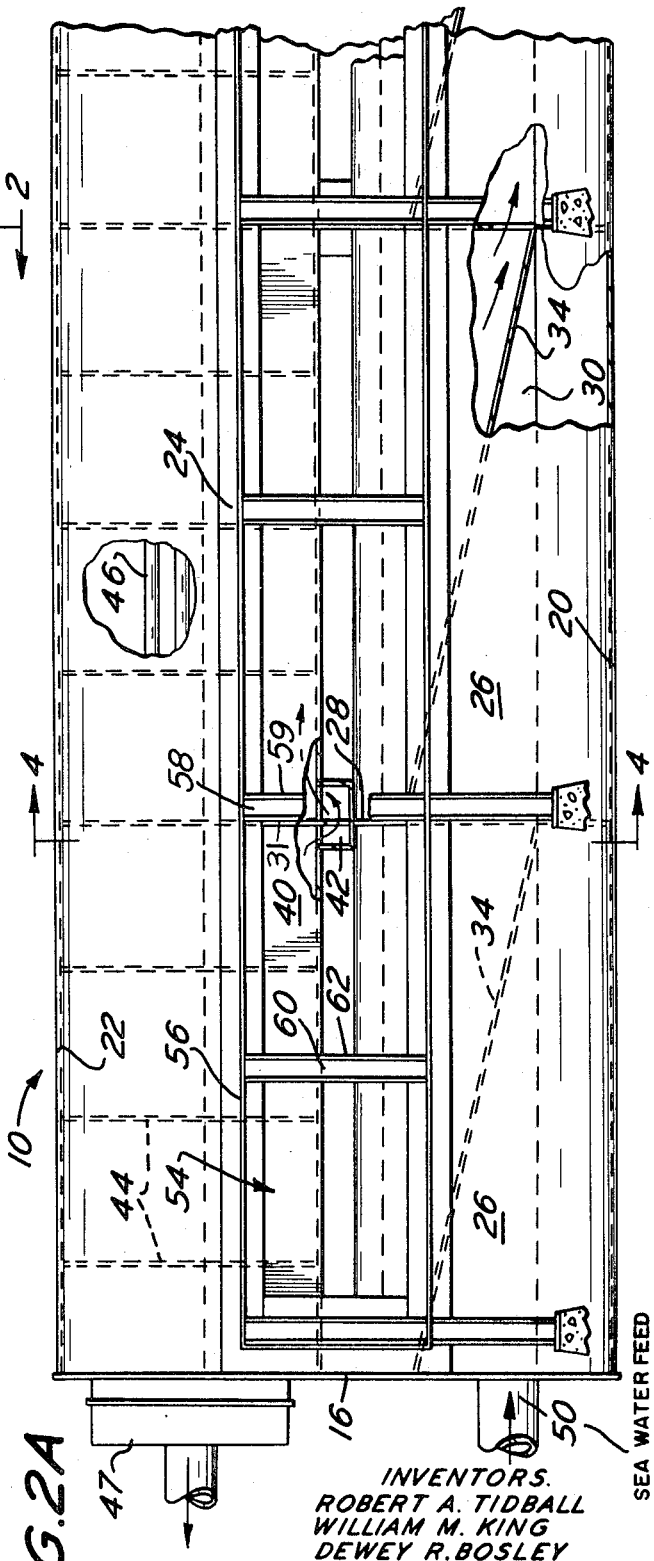
FIG.1
FIG.2A
INVENTORS.
ROBERT A. TIDBALL
WILLIAM M. KING
DEWEY R. BOSLEY
CHARLES M. JENNINGS
BY Seidel & Gonda
ATTORNEYS

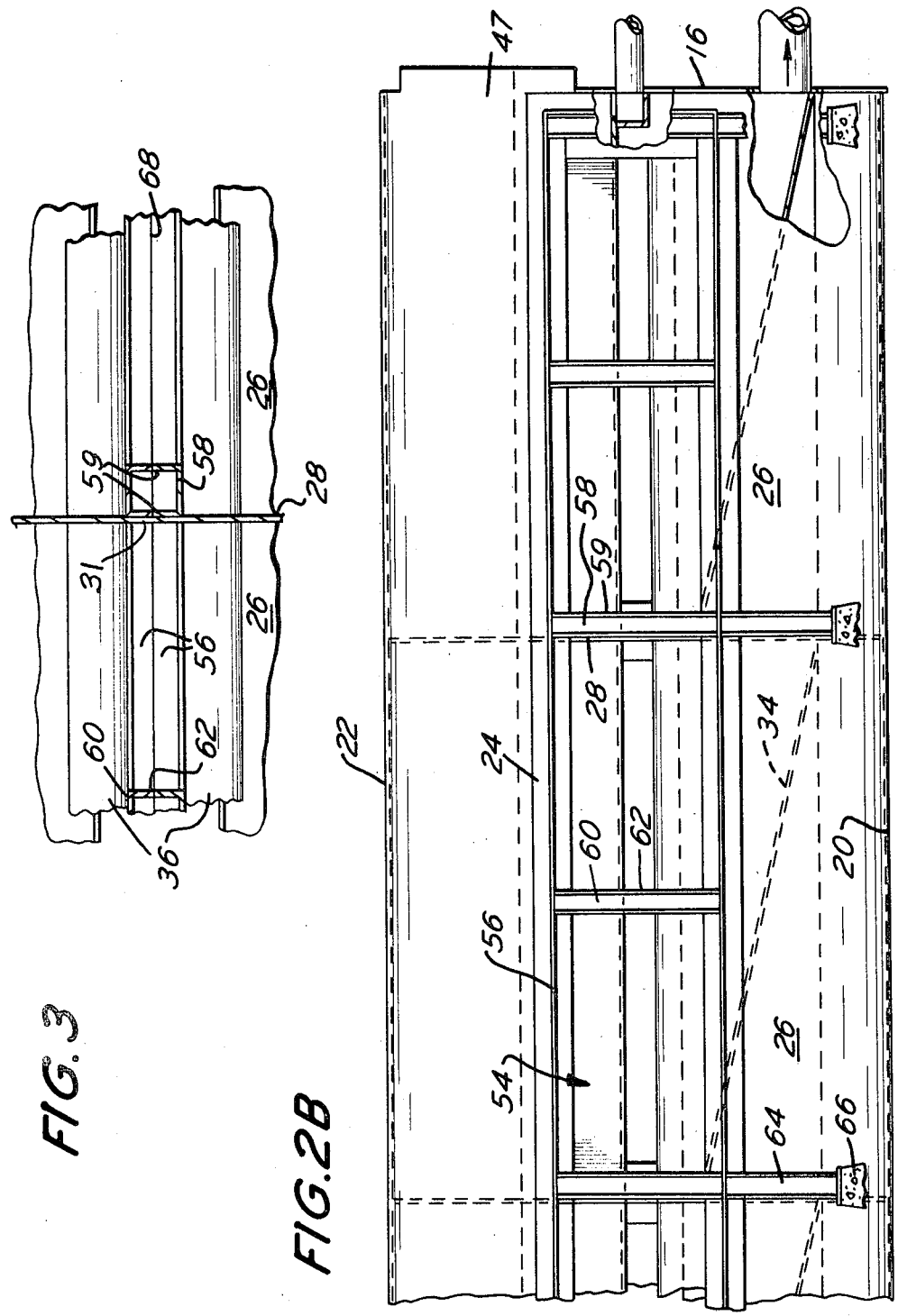

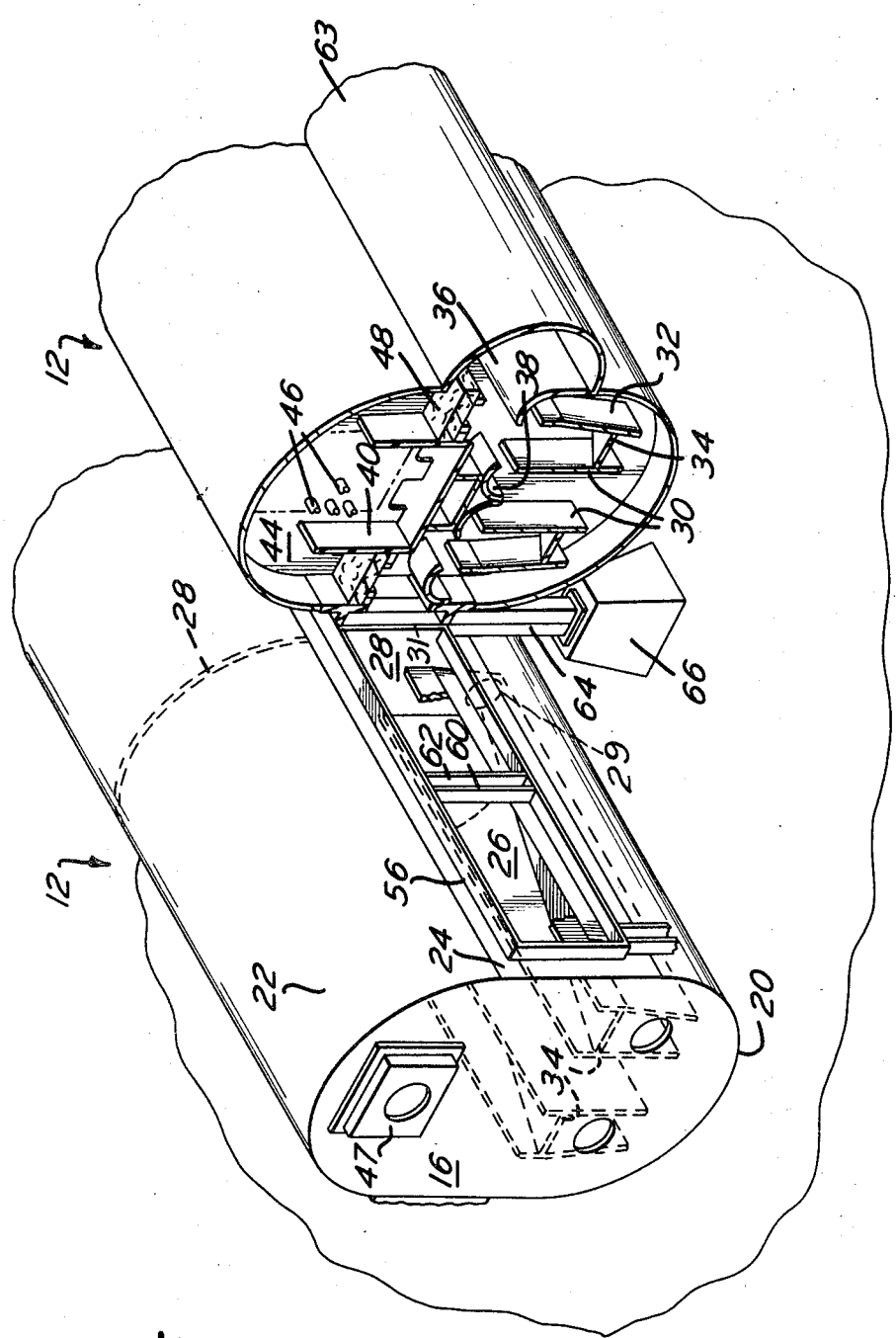

3,580,816
APPARATUS FOR MAKING LARGE DISTILLATION PLANTS
Robert A. Tidball, Swarthmore, Pa., William M. King, Massillon, Ohio, and Dewey R. Bosley, Boothwyn, and Charles M. Jennings, Norwood, Pa., assignors to Baldwin-Lima-Hamilton Corporation, Philadelphia, Pa.
Continuation-in-part of application Ser. No. 554,453, June 1, 1966. This application Oct. 17, 1969, Ser. No. 868,978
Int. Cl. B01d 3/06; C02b 1/06
U.S. Cl. 202—173     3 Claims

ABSTRACT OF THE DISCLOSURE

The shell of a multi-stage distilling plant, wherein preassembled sections, each containing a like series of evaporation stages, have mating openings in their respective side walls providing vapor communication between corresponding stages of sections. Peripheral edges of the openings in the sections and abutting edges of internal partitions and reinforcing members of the sections serve as joints. The joined sections provide a single large multi-stage plant. The method includes steps of fabricating the sections, aligning the fabricated sections, and welding the sections together to form a single large plant.

---

This is a continuation-in-part of our copending application, Ser. No. 554,453, filed June 1, 1966, now abandoned.

This invention relates to a method and apparatus for making large distillation plants. More particularly, this invention relates to apparatus which may be assembled to form a single large distillation plant, and also the method whereby such apparatus is assembled to form a plant.

It is well known that apparatus required for high rate conversion of sea water to water suitable for human consumption or agriculture is extremely large. Consequently, such apparatus presents great problems in manufacture and transport, and indeed, the cost of the apparatus, due in part to the necessity for complex field fabrication, has been one factor tending to retard the development of large capacity sea water conversion plants.

It has been found that fabrication of the complex and relatively delicate internal parts of the apparatus is best done in the shop, under controlled conditions, and with the aid of various production fixtures. Thus, welding of parts such as condenser tubes, tube sheets and internal baffles, if improperly executed, leads to warpage and other defects, and consequently, inherent weakness and reduced thermal performance. Moreover, the complex nature of the internal structure of the apparatus often calls for welds performed from difficult positions and angles. If the major fabrication is performed in the shop, however, the sequence of assembly can be so arranged to minimize the need for difficult welds.

On the other hand, however, the greater the amount of shop fabrication, the more difficult it becomes to ship the finished product to the plant site. Thus, an economical fifty million gallon per day plant should consist of eight individual units or shell, each 75 feet long and 100 feet wide. It is evident that shells of this size could not be shop fabricated and shipped to the installation site. Accordingly, this invention contemplates a method and apparatus whereby equivalent shells are made up of ten sub-assemblies, each 80 feet long and 10 feet wide, in which all of the internal parts are shop fabricated. Such a unit could be shipped by barge or rail from the shop to the plant site, and final assembly and installation accomplished with a minimum amount of field work, none of which involves the critical internal parts of the apparatus.

Accordingly, it is an object of this invention to provide a novel method of assembling large plants.

It is a further object of this invention to provide a novel construction for large plants, particularly, sea water conversion plants.

It is yet another object of the present invention to provide a novel apparatus, which can be assembled with similar structures to form a large plant.

It is still another object of the present invention to provide a large sea water conversion plant in which critical elements are shop fabricated to form transportable units, and then finally assembled by simple procedures at the plant site.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a partial perspective view of a sea water conversion plant constructed in accordance with the present invention.

FIG. 2A is a side elevation view, partially broken away, taken along line 2—2 in FIG. 1.

FIG. 2B is a side elevation view, partially broken away, taken along line 2—2 in FIG. 1, and constituting a continuation of FIG. 2A.

FIG. 3 is a partial sectional view taken along line 3—3 in FIG. 1.

FIG. 5 is a partial perspective view, partially cut away to show internal details of adjacent sections of a distillation plant in accordance with the present invention.

Figure 4:
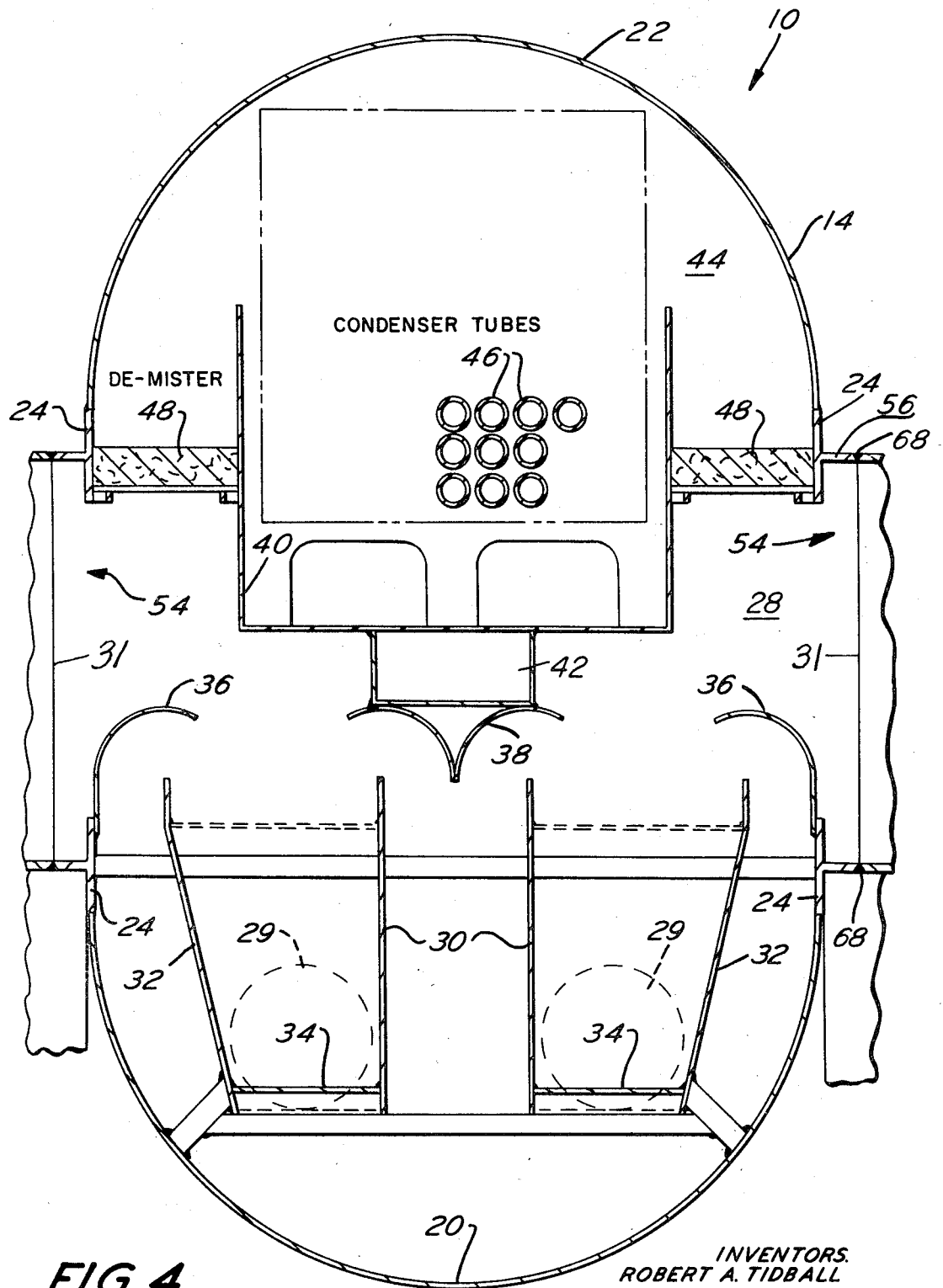
FIG. 4 is an elevation view taken along line 4—4 in FIG. 2A.

Referring now to the drawings in detail, wherein like numerals indicate like elements, there is shown in FIG. 1, a shell, designated generally by the reference numeral 10, of a multi-stage sea water distillation plant. The shell 10, as seen in the figure, is made up of nine individual sections, designated generally by the numeral 12. Each section 12 includes an outer casing 14, including end walls 16, a bottom wall 20, a top wall 22 and side walls 24.

As is best seen in FIGS. 2A and 2B, the section 12 is divided internally into a series of stages 26, the respective stages 26 being separated by spaced upstanding partitions 28. The partitions 28 include orifices 29, the purpose of which will appear later, an outwardly extending edge portions 31.

As is best seen in FIGS. 4 and 5, a pair of spaced, parallel, upstanding walls 30 extend longitudinally of the section 12, and pass through the respective partitions 28. The lower edges of the walls 30 are spaced from the bottom wall 20 of the section 12. A pair of longitudinally extending walls 32, the lower edges of which are also spaced from the bottom wall 20, are disposed on opposite sides of the section, in spaced relation to the outer casing 14. Respective upper edges of the walls 30 and 32 are generally coplanar.

Sloping walls 34 join walls 30 and 32. Referring again to FIGS. 2A, 2B and 4, the sloping walls 34 are secured at a forward edge to a first partition 28 at a location slightly below the upper edges of the walls 30 and 32. The sloping walls 34 are secured at a rearward edge to a second partition 38 on a level with the lower edges of the walls 30 and 32. The aforementioned orifices 29 are disposed between walls 30 and 32, and above the sloping walls 34.

Curved baffle plates 36, to be more fully explained later, are secured to the side walls 24 in overlying relation to the spaces defined by the longitudinal walls 30 and the outer casing 14. The baffle plates 38 are disposed in overlying relation to the space between the respective longitudinal walls 30.

A collector tray 40 extends longitudinally on the section 12 above the baffle plates 36 and 38, and pierces the respective partition 28. Loop seals 42, an example of which is best seen in FIG. 2A, provide communication between segments of the collector tray 40 in adjacent stages. Tube sheets 44, disposed in upright spaced relation above the collector tray 40, support condenser tubes 46. The condenser tubes 46 extend for the entire length of the section 12. A water box 47 is secured outwardly of each of the end walls in fluid communication with the condenser tubes 46.

In view of the foregoing, it is believed that the manner in which section 12 operates to distill sea water is apparent to those skilled in the art. Thus, it is to be understood that each successive stage 26 of the section 12 is to be maintained at a pressure lower than the one next preceding it. Accordingly, the stage 26 farthest to the left in FIG. 2A is the highest pressure stage, and may be conveniently referred to as the first stage. Although pressure in the first stage is higher than that of the next stage, those skilled in the art will appreciate that the pressure therein may be somewhat less than atmospheric pressure.

Sea water to be distilled is introduced into the first stage through the conduit 50 at the left of FIG. 2A. It should be understood that such sea water has been heated prior to its introduction to a temperature higher than its boiling point corresponding to the pressure in the first stage. Thus, upon entry into the first stage, a portion of the sea water "flashes" into steam. Such steam passes upwardly in the spaces defined between the upstanding longitudinal walls 30 and the longitudinal walls 32 and outer casing 14, which spaces, therefore, serve as risers. Liquid particles entrained with the rising steam are partially removed as the steam comes into contact with the curved baffle plates 36 and 38. Liquid so removed falls downwardly onto the upper surfaces of the sloping walls 34 and flows, due to gravity, through the orifices 29, into the next stage. The steam continues to rise, and passes through the demisters 48. There, further entrained liquid is removed. Finally, the well-dried steam comes into contact with the condenser tubes 46, where it condenses to the liquid state. Such condensate is largely free from contamination by salt. The condensate then flows through the loop seal 42 to the next stage 26.

It should be apparent that the loop seal 42 makes it possible to maintain the pressure differences between the successive stage, and that flow of the condensate is also induced by such pressure difference. A portion of the liquid flowing through the orifices 29, since it is subjected to the lower pressure characteristic of the next stage, is flashed into steam, and the aforementioned sequence of events is repeated. Thus, each successive stage adds condensate to the stream flowing in the collector tray.

Coolant, which may take the form of raw sea water, flows in the condenser tubes 46. It should be understood that such coolant enters the water box 47 at the right of FIG. 2B, and leaves by way of a similar water box at the left of FIG. 2A. The coolant is effective to cool the steam and absorb the latent heat of vaporization, thereby causing condensation. It has been found economical to further heat the coolant emerging from the condenser tubes 46 at the first stage, and then introduce it into the first stage through the conduit 50. In this manner, the heat of vaporization of the steam is used to pre-heat the flashing liquid, and substantial economies in fuel are realized. Unflashed liquid, which takes the form of highly concentrated brine, is removed from the system by means of conduit 52 in FIG. 2B, and may be discarded.

It should be understood that the foregoing is a description of a type of evaporator with which the present invention may be used, but that the particular internal arrangement and operative cycle, per se, form no part of the present invention.

Referring now to FIGS. 3, 4 and 5, there is seen a novel aspect of the section 12, which forms an important part of the present invention. Thus, the outer casing 14 includes open wall portions 54. The open wall portions 54 are defined by a peripheral edge, which in the illustrated embodiment is provided with an outwardly extending flange 56. Also, as is apparent from FIG. 5, the partitions 28 extend into the open wall portions, and terminate in edge portions 31. In this illustrated embodiment, the edge portions 31 are coplanar with the outer edges of the flange 56. Portions of the partition 38 may be reinforced, as by a column 58. In the illustrated embodiment, the column 58 includes outwardly extending flanges 59, coplanar with the flange 56 and the edge portion 31 of the partition 28. A column 60 is disposed in the open wall portion 54, and includes outwardly extending flanges 62 coplanar with the flanges 56 and 59, and the edge portion 31 of the partition 28. The section 12 is also provided with spaced, downwardly extending support legs 64 which engage concrete foundations 66.

As is apparent from FIGS. 1 and 5, sections 12, the precise number of which is determined by the desired capacity of the plant, are disposed in juxtaposition with their respective outwardly extending flanges adjacent each other. A joint 68, which may be made by welding or the like, serves to interconnect the adjacent sections 12. The joint comprises the edges of the flanges 56, 59 and 62, and the edge portions 31 of the partition 28. Referring to FIG. 3, corresponding stages of adjacent shells are in fluid communication with each other, and define a single large stage. In the illustrated embodiment, the open wall portions 54 and joints 68 provide for only vapor communication between corresponding stages in adjacent sections 12. Accordingly, it is seen that the novel assembly permits incorporation of transportable "building block" units into a structure of extremely large size. The open wall portions 54 of the sections 12 at the sides of the shell 10 may be closed in any convenient manner, for example, the curved plate 63 of FIGS. 1 and 5.

As has already been seen, the edge portion 31 of the partitions 28 in the illustrated embodiment are coplanar with outer edges of the flange 56. Those skilled in the art will recognize, however, that other arrangements may be provided, so long as edge portions 31 of the partitions 28 in adjacent sections 12 are complemental.

The present invention also encompases a novel method whereby distillation plants of extremely large size may be constructed in an efficient manner. Specifically, the novel method of the present invention contemplates fabrication of the delicate internal parts in the shop, under controlled conditions. There, welding of the tube sheets 44 and tubes 46, for example, may be done efficiently, and to precise specifications. Next, the shells 12 are shipped to the plant site, and placed on foundations 66 in alignment with the peripheral edges of their respective open wall portions adjacent each other. Next, a permanent joint may be made between the peripheral edges, as by welding. External plumbing and controls may be installed after the plant 10 is erected. As is apparent from the drawings, the only field welding required is that needed to join the various abutting parts. These are relatively heavy parts, which, consequently, are not susceptible to warpage during welding. Moreover, the field welds are accessible, and can be executed easily.

Accordingly, it is seen that the novel method and apparatus of the present invention constitutes a clear advance over large distillation plants heretofore known. Thus, the distillation plant of the present invention and plants made in accordance with the method of the present invention have a high degree of reliability, since all critical fabrication is done under shop conditions. Moreover, the necessary field assembly is limited to members of large cross-section and ready accessibility, thereby considerably diminishing the time and expense of field construction.

The present invention may be embodied in other specific forms without departing from the spirit or essential attributes thereof and, accordingly, reference should be made to the appended claims, rather than to the foregoing specification as indicating the scope of the invention.

We claim:

1. A multi-stage distillation plant comprising a plurality of sections juxtaposed together along a horizontal plane, each of said sections including upper, lower, side and end walls, condenser means operatively associated with the upper portion of each of said sections for condensing vapors formed in said sections, each of said sections comprising a series of stages with the stages being separated by respective partitions, means for providing only vapor communication directly between corresponding stages of adjacent sections, said vapor communication means including at least one open side wall portion defined by a peripheral edge including an outwardly extending flange, said partitions including an outwardly extending edge portion for engagement with said peripheral edge of said open side wall portion, and joints interconnecting adjacent sections along said flanges and said edge portions so that corresponding stages of said adjacent sections are interconnected in direct vapor communication with each other, whereby said interconnected corresponding stages define a single multi-stage plant.

2. A multi-stage distillation plant in accordance with claim 1, wherein at least one column is disposed in said open side wall portions coplanar with said flanges, and joints interconnecting the columns in adacent sections.

3. A multi-stage distillation plant in accordance with claim 2 wherein said joints are welds.

References Cited

UNITED STATES PATENTS

| | | | |
|---|---|---|---|
| 3,142,381 | 7/1964 | Ris et al. | 202—173 |
| 3,192,131 | 6/1965 | Loebel et al. | 202—173X |
| 3,197,387 | 7/1965 | Lawrance | 202—173 |
| 3,275,530 | 9/1966 | Akers | 202—173X |
| 3,281,334 | 10/1966 | Williamson | 202—173 |
| 3,488,260 | 1/1970 | Gilbert | 202—172 |
| 3,440,146 | 4/1969 | Louw | 203—11 |

OTHER REFERENCES

Chemical Engineering, October 1956, pp. 126–130.

NORMAN YUDKOFF, Primary Examiner

F. E. DRUMMOND, Assistant Examiner

U.S. Cl. X.R.

159—17; 202—174, 205; 203—11